United States Patent [19]

Morawietz

[11] Patent Number: 4,995,885

[45] Date of Patent: Feb. 26, 1991

[54] CONCENTRATED AQUEOUS DYE SOLUTIONS FOR DYEING PAPER

[75] Inventor: Hans Morawietz, Seewen, Switzerland

[73] Assignee: Ciba-Geigy Corp., Ardsley, N.Y.

[21] Appl. No.: 434,157

[22] Filed: Nov. 13, 1989

[30] Foreign Application Priority Data

Nov. 15, 1988 [CH] Switzerland ............ 4223/88

[51] Int. Cl.$^5$ ............ C09B 29/01; C09B 67/26; C09B 69/04
[52] U.S. Cl. ............ 8/527; 8/604; 8/684; 8/689; 8/691; 8/918; 8/919
[58] Field of Search ............ 8/527, 604, 691

[56] References Cited

U.S. PATENT DOCUMENTS

| | | | |
|---|---|---|---|
| 2,692,263 | 10/1954 | Taube | 534/737 |
| 3,862,116 | 1/1975 | Toji | 8/684 |
| 4,071,312 | 1/1978 | Blackwell | 8/648 |
| 4,877,412 | 10/1989 | Pedrazzi | 8/437 |

FOREIGN PATENT DOCUMENTS 3443595 5/1986 Fed. Rep. of Germany .
1333023 10/1973 United Kingdom .

*Primary Examiner*—A. Lionel Clingman
*Attorney, Agent, or Firm*—George R. Dohmann

[57] ABSTRACT

Concentrated dye solutions of the formula (1) shown in claim 1 are described.

The dye solutions are notable for a long shelf life and are suitable in particular for dyeing paper.

15 Claims, No Drawings

CONCENTRATED AQUEOUS DYE SOLUTIONS FOR DYEING PAPER

The present invention provides concentrated aqueous dye solutions containing (a) 7 to 30% by weight of a dye of the formula

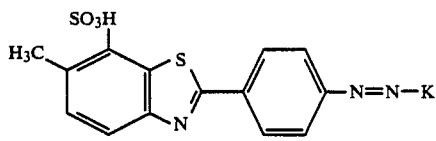

where K is a coupling component of the acetoacetanilide, pyridone, pyrazolone or pyrimidine series, (b) 1 to 5 moles of 3-diethylamino-1-propylamine, 2-diethylaminoethanol or 2-(2-aminoethoxy)ethanol per mole of dye of the formula (1) and (c) further, optional additives.

Preferably, the dye solutions according to the invention contain 10 to 25% by weight of a dye of the formula (1).

In the above formula (1) K is a coupling component of the acetoacetanilide, pyridone pyrazolone or pyrimidine series. The possibilities listed cover in particular the coupling components customary for azo dyes, in particular dyes for paper.

Preferably, K is a coupling component of the formula

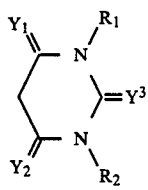

where $Y^1$ and $Y^2$ are each independently of the other $=O, =NH$ or $=N-C_1-C_4 alkyl$, $Y^3$ is $=O, =S, =NR$ or $=N-CN$, where R is hydrogen or $C_1-C_4 alkyl$ and $R^1$ and $R^2$ are each independently of the other hydrogen, substituted or unsubstituted alkyl or substituted or unsubstituted phenyl.

The above formula (2), although showing only one of the possible tautomeric forms of coupling component, shall be taken to encompass all the tautomeric forms as well.

Substituted or unsubstituted alkyl $R^1$ or $R^2$ is for example methyl, ethyl, n-propyl, isopropyl, n-butyl, sec-butyl, tert-butyl, straight-chain or branched pentyl or hexyl, or cyclohexyl, which may each be monosubstituted or polysubstituted, for example by —OH, $C_1-C_4 alkoxy$ or $C_1-C_4 hydroxyalkoxy$.

Examples of suitable substituted alkyl are: methoxymethyl, ethoxymethyl, ethoxyethyl, ethoxypropyl, n-propoxymethyl, isopropoxymethyl, butoxymethyl, butoxyethyl, butoxypropyl, ethoxypropyl, methoxybutyl, ethoxypentyl and 2-hydroxyethoxypentyl.

Substituted or unsubstituted phenyl $R^1$ or $R^2$ can be for example phenyl itself or phenyl which is monosubstituted or polysubstituted by identical or different radicals.

Examples of such radicals are: $C_1-C_4 alkyl$, (which is this application means generally methyl, ethyl, n-propyl, isopropyl, n-butyl, sec-butyl or tert-butyl), $C_1-C_4 alkoxy$ (which in this application means generally methoxy, ethoxy, n-propoxy, isopropoxy, n-butoxy, sec-butoxy or tert-butoxy), halogen such as fluorine, chlorine or bromine, and nitro.

Preferably, phenyl $R^1$ and/or $R^2$ is unsubstituted phenyl or $C_1-C_4 alkyl$-, chlorine-or methoxy-monosubstituted, -disubstituted or-trisubstituted phenyl, in particular unsubstituted phenyl.

$R^1$ and $R^2$ are each preferably hydrogen or $C_1-C_4 alkyl$, particularly preferably hydrogen or methyl.

$Y^1$ and/or $Y^2$ are each preferably a functional group $=O$ or $=NH$, and are preferably identical to each other. $Y^1$ and $Y^2$ are particularly preferably identical, each being $=NH$.

$Y^3$ is preferably $=O, =S, =NH$ or $=N-CN$, in particular $=NH$.

In a particularly preferred embodiment, the dye solutions according to the invention contain azo dyes of the formula (1) where $R^1$ and $R^2$ are each independently of the other hydrogen or $C_1-C_4 alkyl$, $Y^1$ and $Y^2$ are each independently of the other $=O$ or $=NH$, and $Y^3$ is $=O, =S, =NH$ or $=N-CN$.

The dyes of the formula (1) are known or are obtained in a known manner.

The acqueous dye solutions according to the invention contain at least one mole of an amine selected from the group consisting of 3-diethylamino-1-propylamine, 2-diethylaminoethanol and 2-(2-aminoethoxy)ethanol per mole of dye of the formula (1). Preferably, the dye solutions contain 1 to 4 moles of amine per mold of dye. Of the amines mentioned, 3-diethylamino-1-propylamine is particularly perferred.

In addition, the dye solutions according to the invention may contain water-soluble organic solubilizers. Possibilities are for example: urea, formamide, ε-caprolactam, dimethylformamide, 1,2-diaminopropane, polyhydric alcohols, e.g. ethylene glycol, propylene glycol or glycerol, and alkanolamines, e.g. ethanolamine, diethanolamine, triethanolamine, 2-dimethylaminoethanol, 2-methylaminoethanol, N,N-bis(2-hydroxyethyl)-1,3-diaminopropane or N-(2-hydroxyethyl)ethylenediamine.

The amount of organic solubilizer depends inter alia on the amount of the three abovementioned amines, 3-diethylamino-1-propylamine, 2-diethylaminoethanol or 2-(2-aminoethoxy)ethanol, in the dye solution. If about 2 to 4 moles of the amines mentioned are present per mole of dye, generally no organic solubilizer or only about 5 to 10% by weight thereof, based on the total weight of the dye solution, is required. On the other hand, it is frequently advantageous for economic reasons to adjust the amines mentioned to about 1 to 2.5 moles per mole of dye and to use in addition about 10 to 25% by weight of organic solubilizer.

Preferred aqueous dye solutions according to the invention contain (a) 10 to 30% by weight of a dye of the formula (1), (b) 1 to 4 moles of 3-diethylamino-1-propylamine, 2-diethylaminoethanol or 2-(2 -aminoethoxy)ethanol per mole of dye of the formula (1), and (c) 0 to 25% by weight of an organic solubilzer.

Of these, particular preference is given to those which contain (a) 10 to 30% by weight of a dye of the formula (1), (b) 1 to 2.5 moles of 3-diethylamino-1-propylamine, 2-diethylaminoethanol or 2-(2-aminoethoxy)ethanol per mole of dye of the formula (1) and (c) 10 to 25% by weight of an organic solubilizer.

The concentrated aqueous dye solutions according to the invention are in general prepared by stirring the free dye acids with a mixture of water, 3-diethylamino-1-propylamine, 2-diethylaminoethanol or 2-(2-aminoethoxy)ethanol in the presence or absence of an organic solubilizer until a homogeneous solution has formed. If necessary, the mixture can be heated, for example to 40-80° C., and possibly filtered.

The concentrated aqueous dye solutions obtained are notable in particular for a long shelf life.

The concentrated dye solutions according to the invention are used as they are or after dilution with water, particularly for dyeing and printing paper, including paperboard and cardboard, the dyeing of these materials being effected for example in the mass, by coating or by dipping. Moreover, such a liquid formulation may also be used for the continuous or bathwise dyeing of textile materials, in particular cellulose.

The Examples which follow illustrate the invention. Parts are by weight.

EXAMPLE 1

920 parts of an aqueous presscake containing 260 parts of the dye of the formula

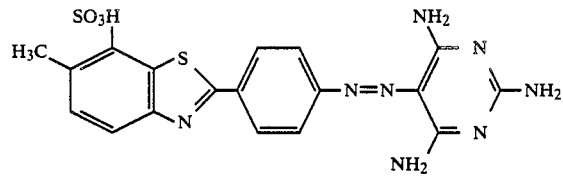

in the form of the free dye acid are admixed with 296 parts of 3-diethylamino-1-propylamine, and the mixture is adjusted with water to a total weight of 2080 parts. The suspension obtained is heated with stirring to 50° C. and is stirred at that temperature until all the dye has dissolved. The dye solution is then clarified.

The result obtained is a commercial liquid dye which even after storage at 3-5° C. for one month does not show any residue whatsoever.

EXAMPLE 2

920 parts of the same aqueous presscake as in Example 1 are admixed with 296 parts of 3-diethylamino-1-propylamine and 291 parts of urea, and the mixture is adjusted with water to a total weight of 2080 parts and otherwise further processed into a commercial liquid formulation as described in Example 1.

The commercial formulation does not show any solid residues whatsoever even after storage at 3-5° C. for one month.

EXAMPLE 3

920 parts of the same aqueous presscake as in Example 1 are admixed with 148 parts of 3-dimethylamino-1-propylamine, 60 parts of diethanolamine, 43 parts of 2-methylaminoethanol and 291 parts of urea, and the mixture is adjusted with water to a total weight of 2080 parts and otherwise further processed into a commercial liquid formulation as described in Example 1.

This commercial formulation does not show any solid residues whatsoever even after storage at 3-5° C. for one month.

EXAMPLE 4

920 parts of the same aqueous presscake as in Example 1 are admixed with 148 parts of 3-diethylamino-1-propylamine, 60 parts of diethanolamine and 43 parts of 2-methylaminoethanol, and the mixture is adjusted with water to a total weight of 2080 parts and otherwise further processed into a commercial liquid formulation as described in Example 1.

This commercial formulation does not show any solid residues whatsoever even after storage at 3-5° C. for one month.

EXAMPLES 5-9

Example 3 is repeated, except that the dye used therein is replaced by equivalent amounts of the dyes obtained by diazotization of dehydrothiotoluidine-7-sulfonic acid and coupling to the coupling components listed in the table below.

This method produces concentrated solutions of the dyes, which are notable for a long shelf life.

| Example | Coupling component |
| --- | --- |
| 5 | Barbituric acid |
| 6 | Cyanoiminobarbituric acid |
| 7 | 3-Methyl-5-pyrazolone |
| 8 | 1,3-Dimethylbarbituric acid |
| 9 | 4-Amino-2,6-dihydroxypyrimidine |

EXAMPLE 10

Example 1 is repeated, except that the 296 parts of 3-diethylamino-1-propylamine are replaced by the same amount of 2-diethylaminoethanol. A commercial stable liquid dye is obtained.

EXAMPLE 11

Example 1 is repeated, except that the 296 parts of 3-diethylamino-1-propylamine are replaced by the same amount of 2-(2-aminoethoxy)ethanol. A stable commercial liquid dye is obtained.

EXAMPLE 12

In a hollander, 70 parts of chemically bleached sulfite cellulose from softwood and 30 parts of chemically bleached sulfite cellulose from birchwood are beaten in 2000 parts of water. 0.3 part of the commercial dye formulation described in Example 3 is added. After 20 minutes of mixing, the stock is used for papermaking. The absorbent paper obtained in this manner has a yellow colour. The waste water is virtually colourless.

What is claimed is:

1. A concentrated aqueous dye solution containing
   (a) 7 to 30% by weight of a dye of the formula

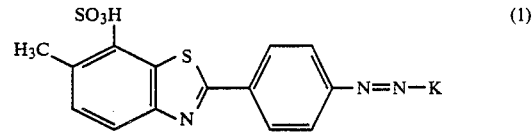

(1)

where K is a coupling component of the acetoacetanilide, pyridone, pyrazolone or pyrimidine series,
   (b) 1 to 5 moles of 3-diethylamino-1-propylamine, 2-diethylaminoethanol or 2-(2-aminoethoxy)ethanol per mole of dye of the formula (1) and
   (c) further, optional additives.

2. A concentrated aqueous dye solution according to claim 1, containing 10 to 25% by weight of a dye of the formula (1).

3. A concentrated aqueous dye solution according to claim 1, containing a dye of the formula (1) where K is a coupling component of the formula

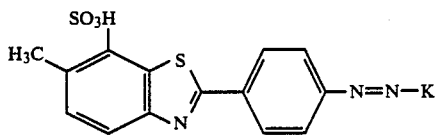

where $Y^1$ and $Y^2$ are each independently of the other $=O$, $=NH$ or $=N-C_1-C_4$alkyl, $Y^3$ is $=O$, $=S$, $=NR$ or $=N-CN$, where R is hydrogen or $C_1-C_4$alkyl and $R^1$ and $R^2$ are each independently of the other hydrogen, unsubstituted alkyl substituted by OH, $C_1-C_4$-alkoxy or $C_1-C_4$-hydroxyalkoxy or unsubstituted phenyl or phenyl which is substituted by $C_1-C_4$-alkyl, $C_1-C_4$-alkoxy, halogen or nitro.

4. A concentrated aqueous dye solution according to claim 1, wherein $R^1$ and $R^2$ are each independently of the other hydrogen or $C_1-C_4$alkyl.

5. A concentrated aqueous dye solution according to claim 1, wherein $Y^1$ and $Y^2$ are each independently of the other $=O$ or $=NH$.

6. A concentrated aqueous dye solution according to claim 1, wherein $Y^3$ is $=O$, $=S$, $=NH$ or $=N-CN$.

7. A concentrated aqueous dye solution according to claim 6, wherein $Y^3$ is $=NH$.

8. A concentrated aqueous dye solution according to claim 1, wherein $R^1$ and $R^2$ are each independently of the other hydrogen or $C_1-C_4$alkyl, $Y^1$ and $Y^2$ are each independently of the other $=O$ or $=NH$ and $Y^3$ is $=O$, $=S$, $=NH$ or $=N-CN$.

9. A concentrated aqueous dye solution according to claim 1, containing 1 to 4 moles of 3-diethylamino-1-propylamine, 2-diethylaminoethanol or 2-(2-aminoethoxy)ethanol per mole of dye.

10. A concentrated aqueous dye solution according to claim 1, containing 3-diethylamino-1-propylamine.

11. A concentrated aqueous dye solution according to claim 1, containing in addition an organic solubilizer.

12. A concentrated aqueous dye solution according to claim 1, containing urea, ecaprolactam, a polyhydric alcohol or an alkanolamine as organic solubilizer.

13. A concentrated aqueous dye solution according to claim 1, containing
(a) 10 to 30% by weight of a dye of the formula (1),
(b) 1 to 4 moles of 3-diethylamino-1-propylamine, 2-diethylaminoethanol or 2-(2-aminoethoxy)ethanol per mole of dye of the formula (1), and
(c) 0 to 25% by weight of an organic solubilizer.

14. A concentrated dye solution according to claim 13, containing
(a) 10 to 30% by weight of a dye of the formula (1),
(b) 1 to 2.5 moles of 3-diethylamino-1-propylamine, 2-diethylaminoethanol or 2-(2-aminoethoxy)ethanol per mole of dye of the formula (1) and
(c) 10 to 25% by weight of an organic solubilizer.

15. A process for preparing a concentrated aqueous dye solution, which comprises stirring 7-30% by weight of a dye of the formula

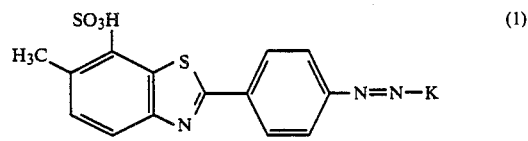

where K is a coupling component of the acetoacetanilide, pyridone, pyrazolone or pyrimidine series, with a mixture of water, 3-diethylamino-1-propylamine, 2-diethylaminoethanol or 2-(2-aminoethoxy)ethanol in the presence or absence of an organic solubilizer until a homogeneous solution has formed.

* * * * *